United States Patent Office 3,764,384
Patented Oct. 9, 1973

3,764,384
PROCESS FOR REMOVING POLYVINYL HALIDE
RESIDUES FROM PROCESSING EQUIPMENT
Rene P. Berni, Oradell, N.J., assignor to GAF
Corporation, New York, N.Y.
No Drawing. Filed July 24, 1970, Ser. No. 58,201
Int. Cl. B08b 3/08, 3/10, 9/08
U.S. Cl. 134—12
10 Claims

ABSTRACT OF THE DISCLOSURE

A process for removing residues of polymeric materials particularly vinyl halide homopolymers from processing equipment by a solvent cleaning technique based upon contacting such residues within the equipment with N-methyl pyrrolidone and thereby loosening, suspending or dissolving same. The contacting operation is preferably by means of a spray applied at elevated temperatures. Provision is made for recycling the solvent and recovering the solvent and/or the polymeric residues.

FIELD OF THE INVENTION

The invention is directed to a novel system for the removal of residues of polymeric material which accumulate within and upon the surfaces of the polymerization equipment. In particular, the present invention is directed to the removal of such residues utilizing a unique recycling solvent system including N-methyl pyrrolidone.

BACKGROUND OF THE INVENTION AND PRIOR ART

The continuing build-up of residual polymeric materials in the polymerization reactors and in and upon associated equipment after the removal of the charge in batch processing and during continued operation in continuous processing poses problems. The problems are threefold, (1) the residues, inasmuch as they are continually exposed to the polymerization conditions, tend to vary in molecular weight beyond the intended ranges of the primary operation, and often, as the molecular weight increases, the residues become embrittled and flake off into the primary product; (2) the efficiency of the reaction is reduced since the build-up of the residues on the surfaces of the processing equipment reduces its heat-transfer capabilities and overall process control; and (3) the residues often dangerously clog the emergency venting equipment for providing relief should runaway pressures ensue within the reaction vessel. Ultimately these factors require complete shutdown of the operation for extended periods for cleaning the equipment. This, of course, leads to reduced operating efficiency and reduction in overall production.

The cleaning operation can be accomplished either mechanically or chemically. Mechanical cleaning requires dismantling of the equipment and the introduction of a cleaning crew within the reactors to manually chip the residues of polymerized material from the inner surfaces of the vessels. This is time-consuming, expensive and is hazardous to the workers engaged in the operation due to the explosive and toxic nature of many of the reactants and solvents involved in the polymerization reactions. The uniformity of protective coatings upon the surfaces of the reaction vessels may also be destroyed by chipping or the physical nature of the surfaces of the reaction vessels may be so altered as to catalyze undesirable side reactions by exposure to the underlying metals.

The chemical cleaning methods used heretofore have certain drawbacks due to the inherent nature of the chemicals used. A method based on methylene dichloride and kerosene has been proposed. This mixture loosens the bond at the reaction vessel surfaces between the reaction vessel and the residual polymeric material. The loosened material is then washed from the surfaces by agitating the mixture and then draining the mixture with its suspended contaminants from the vessel.

Several solvents for the polymer residues have also been proposed for cleansing wherein the reaction vessels are filled with the solvent and the residues dissolved therein. Thereafter the solution is removed from the reaction vessel by draining. The previously proposed solvents and solvent systems while moderately effective, each have had some significant drawbacks. The solvents were either explosive, formed gels with the polymer thus causing pumping difficulties or left their own residues as foreign matter. Such foreign matter in and on the reaction vessel surfaces had a tendency to degrade the quality of succeeding batches of the polymer. Additionally, often such contaminating solvents because of their irritant factors downgraded the final polymer or rendered it unfit for certain premium uses.

SUMMARY OF THE INVENTION

The instant invention according to one aspect, comprises contacting the polymeric residue contaminants accumulated on the inner surfaces of the polymerization equipment with heated N-methyl pyrrolidone or a solvent system containing N-methyl pyrrolidone in major proportions for a sufficient time to loosen and/or dissolve said accumulations. The solvent containing the polymeric material is then discharged from the reaction vessel being cleaned. The discharged solvent may then be used in further cleaning processes or if sufficiently loaded with polymer residues, subjected to a regeneration process according to another aspect of this invention so as to remove the dissolved polymerization reaction residues and the regenerated solvent is then recycled to the cleaning system.

The process of the instant invention is useful for cleaning the reaction apparatus employed in the polymerization of polymers, particularly for the vinyl polymers including the polymers of vinyl halides and their copolymers. The polymers for which this cleansing system is particularly effective include, for example, the vinyl chloride polymers and copolymers thereof with any one of the numerous monomers. The particular monomer employed for the copolymerization with the vinyl halide is not critical to the instant invention and may be exemplified by vinyl acetate, vinyl laurate, alkyl acrylates, alkyl methacrylates, alkyl maleates, alkyl fumarates, vinylidene chloride, acrylonitrile, vinyl alkyl ethers such as vinyl acetyl ether, vinyl lauryl ether, vinyl myristyl ether, and the like. Furthermore, such copolymers may be a graft copolymer in which one of the constituents is polymeric in nature, while the other constituent is a monomer. Exemplary of such grafting materials are polyethylene, copolymers of ethylene, vinyl acetate, and others. Furthermore, the instant invention is applicable in connection with other polymeric residues such as nylon C, polyesters, polyurethanes, polyacrylonitriles, polyacrylates, polymethacrylates, and copolymers and/or graft polymers thereof.

As previously mentioned, the prior art techniques have had various drawbacks including the toxicity of the solvents, the danger of explosion or fire and the inherent toxicity and the corrosive nature of many of the previously employed solvents or reactants. The N-methyl pyrrolidone of the present invention is particularly useful and well suited for the solvent cleaning of polymerization reaction vessels due to its excellent solubility characteristics for the polymeric residues. It has inherently suitable explosive- and corrosive-resistent characteristics and most importantly has an extremely low irritant index for personnel exposed thereto. Furthermore, the material is completely non-corrosive to the various commonly used reaction vessel materials and will not and does not effect the surface characteristics thereto in any manner likely to interfere with the course of the polymerization reaction.

Normally, one would not think of using N-methyl pyrrolidone as a solvent for systems of this type when one compares the costs of the material of this invention with the previously used solvents. However, due to efficient regeneration procedures herein provided for removing the dissolved residues from the solvent, it is possible to economically recover and recycle almost all of the N-methyl pyrrolidone solvent for repeated reuse. Because of its low-vapor pressure and high boiling point, 98% plus is recoverable. In addition, in contrast to many previously used solvent systems, it does not form azeotropic mixtures with water. The discovery of the low-loss extraction and purification procedure permits reuse of N-methyl pyrrolidone at economical rates that are competitive with and economically more attractive than other proposed systems.

There have been numerous other solvents proposed for use in dissolving the polymeric residues in reaction vessels such as, for example, trimethylene oxide, tetramethyl urea, dimethylacetamide, tetrahydrofuran, cyclohexanone, cyclopentanone, cyclohexene oxide, diethyl acetamide, diethyl formamide, dimethyl formamide, tetrahydropyran ethylene oxide, methyl ethyl ketone, dioctyl phthalate, dioxane, and many others. Such solvents vary, however, in effective dissolution strength against the higher molecular weight of the polymeric contaminant to be dissolved. Furthermore, such other solvents suffer from serious disadvantages with regard to one or more of their toxicity, flash point, and explosive characteristics, as may be seen from the following table, wherein comparisons of such characteristics are made between the solvent of the instant invention, i.e., N-methyl pyrrolidone, and methylethyl ketone, cyclohexanone, and tetrahydrofuran:

According to the preferred process of the instant invention, the solvent N-methyl pyrrolidone is drawn from a clean solvent storage tank and pumped through a heating unit which serves to elevate the temperature thereof. The solvent may be used over a broad range of temperatures of from about 75 to 150° C. Preferably, however, the solvent is heated to a temperature of from about 85 to about 125° C. Subsequent to the heating, the solvent is then sprayed into the reactor by any convenient technique.

The N-methyl pyrrolidone solvent for this invention may be diluted with minor proportions of any of the common solvents for the polymeric residues previously used in the art but such dilution is not preferred as it introduces many of the drawbacks associated with such solvents and raises problems in subsequent regeneration of the solvent by evaporation, fractional distillation or other procedures. It has been found that up to 5% of water will be picked up by the N-methyl pyrrolidone in the course of its recirculation through the polymerization equipment. Most of this results from residual moisture in such equipment from the polymerization process. Its entrance into the N-methyl pyrrolidone in such small amounts is not deleterious to the solvating efficiency of the N-methyl pyrrolidone.

In general, it is preferred to introduce the N-methyl pyrrolidone into the polymerization apparatus at elevated temperatures. The higher the temperature, the more rapidly it dissolves the polymeric residues. However, at too high temperatures, the vapor pressure of the N-methyl pyrrolidone will be high enough to cause significant solvent losses. At too low temperatures, the solvent times are too long for efficient industrial cleansing operations. Generally, the temperature of the N-methyl pyrrolidone as introduced into the reaction vessel should be in the range of 75–150° C., with the range of 80–125° C. preferred and the range of 90–105° C. is optimal. It is expedient to maintain the temperature of the polymerization equipment being cleansed within these temperature ranges. By

SOLVENT COMPARISON CHART

| Solvent | M-pyrol | MEK | Cyclohexanone | Tetrahydrofuran |
|---|---|---|---|---|
| Boil point, °F | 395 | 174 | 315 | 151. |
| Estimated solvent recovery, percent | [1] 98 | | | 98. |
| Ease of separation of resin | Excellent | Poor | Fair-good | Good-excellent. |
| Vapor pressure, in mm. Hg, at operating temperatures: | | | | |
| 151° F | | 480 | | 760. |
| 212° F | 30 | | 136 | |
| Flash point, °F.: | | | | |
| TAG open cup | 204 | 24 | 147 | |
| Cleveland open cup | | | | −4. |
| Threshold limit value (MAC), p.p.m. | [1] 200 | 200 | 50 | 200. |
| Eye irritation studies (equivalent seconds) | 180, 199 | | | 77, 79. |
| Viscosity of PVC solution (10% solids) c.p.s. at: | | | | |
| 151° F | 116 | Gels | Insoluble | 44 (8% solids). |
| 212° F | 34 | | Gels | |
| Explosive limits (percent by volume in air at 25° C.) | Negligible, 0.9 at 105° C., 3.9 at 125° C. | 2–12 | Negligible, 1.1 at 100° C | 1.8–11.8. |
| Tendency to form peroxides during solvent recovery | No | No | No | Yes. |
| Water/solvent azeotrope formation | No | No | No | Yes. |
| Quantity of solvent used per percent of reactor volume [1] | 10–25 | 50 | 50 | 50. |

[1] Estimated value based on inhalation and other toxicity studies.

As may readily be seen from an analysis of the foregoing table, the solvent of the instant invention, i.e., N-methyl pyrrolidone, is superior to other previously recommended solvents and, therefore, is particularly well-suited for use in connection with the instant invention. That is to say, that N-methyl pyrrolidone, because of its high flash point, solubility rate for high molecular weight polymeric contaminants, and high safety factor, has been found to be extremely useful in the process of the instant invention. Furthermore, it is noted that said N-methyl pyrrolidone is particularly well-suited for the subject process as it does not form an azeotrope with water and is therefore easily separated therefrom. Furthermore, because of the low vapor pressure of said compound and its high boiling point, 98%+ of the N-methyl pyrrolidone used is recoverable. These features lower the cost of the use thereof relative to other such solvents.

maintaining these temperature ranges in the polymerization equipment, little additional heating is necessary during the recycling of the solvents from the bottom of the tank to the spray heads at the top of the tank.

Operating within the preferred ranges, the solution of the residues is completed within 10–60 minutes. At the optimum range, successful cleansing of all types of polymerization equipment has been completed within 20–40 minutes for various types of polymerization residues. At temperatures below about 90° C., longer times are needed but even at 40° C., the polymerization residues from various polymerization processes are removed within four hours by exposure to the N-methyl pyrrolidone.

The exposure and contacting of the polymerization residue to the N-methyl pyrrolidone solvents can be effected in various ways. The residues can be covered with the liquid body which is then agitated in order to achieve solution, The residues can also be subjected to streams of the liquid solvent. The residues preferably can be impacted by impinging liquid particles to achieve solution as well as dislodgement, for later solution, is thus achieved.

The polymerization equipment can, of course, be filled with solvent which is then agitated until the residues are dissolved. This method requires inordinately large amounts of solvent. The solvents may also be streamed over the surface of the equipment having accumulated polymerization residues from nozzles or similar solvent access means. It is preferred to introduce the N-methyl pyrrolidone into the polymerization equipment as impinging liquid particles by spraying the N-methyl pyrrolidone from retractable spray heads into the upper portions of the polymerization equipment.

Spray heads which will generate circular spray patterns that will insure complete coverage and impingement of the spray upon all residue-bearing surfaces are preferred. The spray impingement upon the residue rapidly dissolves the accumulated layers or particles of the residues and the solution flows to the bottom of the polymerization equipment. The drainage of the dissolved and/or dislodged residue in the solvent is permitted to accumulate at the lower portions of the polymerization equipment where dislodged particles may dissolve and from where it is pumped via surge tanks and recirculated to the spray heads. In this manner, a relatively small amount of solvent can adequately serve to dissolve and dislodge all the polymeric residues within the equipment.

N-methyl pyrrolidone is preferably used in an amount equal to at least 10% by volume of the polymerization equipment. In order to prevent too rapid a build-up of the residues within the N-methyl pyrrolidone which may cause viscosity problems, it is expedient and economically more attractive to use 20-25% by volume of the polymerization equipment of the N-methyl pyrrolidone. After the completion of the removal of the residue from one complete unit of polymerization equipment, it is then expedient and desirable to drain the residue-containing solvent from the unit, to remove the retractable heads and insert them into another unit of polymerization apparatus and successively clean such other unit. This may be continued with this volume of solvent until the residue build-up within the solvent is in the range of 1.5% to saturation of the solvent with residue. In general, it is preferred not to exceed a residue pickup by the solvent of 5-7%. At that solvent loading stage, it is most efficient to subject the solvent to a regeneration cycle as set forth below wherein the polymer residues are removed from the solvent and the solvent purified for reuse.

After the polymerization equipment unit is cleaned of polymerization residues as described above and the solvent drained therefrom, it is useful to wash the interior surfaces of the polymerization equipment by spraying said surfaces with a small amount of water and then permitting the water to drain from the equipment. The equipment can also thereafter be heated until dry. The unit is then ready for resumption of polymerization therein.

When the amount of residue dissolved in the N-methyl pyrrolidone reaches 1.5 to 7%, it is desirable to regenerate, purify and recover the N-methyl pyrrolidone. At that time, in addition to the residue, the solvent mixture may contain up to about 8% by weight of water.

The N-methyl pyrrolidone is drained from the polymerization apparatus into a dirty solvent tank. From here, it may be directly fed to a multi-stage evaporator system or pretreated as hereinafter set forth. When fed directly to the multi-stage evaporator system, the initial stages of such a system will boil off solvent and water, concentrating the residue to a point where the viscosity of the solution dictates the use of a mechanically-aided evaporator stage.

A preferred mechanically-aided evaporator stage is a thin film processor operating on the turbulent film principle, although other systems designed to remove solvents from viscous solutions will also serve. The feed stream entering the unit is thrown by centrifugal force against the heated process wall to form a turbulent film between the wall and the rotary blade tips. The turbulent film covers the entire jacketed surface of the process wall at all times regardless of the evaporation rate. The viscous material is exposed to boiling temperatures for only seconds and its exposure time is controlled through feed rate and evaporation rate. A suitable device of this type is marketed by Artisan Industries, Inc. of Waltham, Mass. as a Rototherm® turbulent film evaporator.

This mechanically-aided evaporator stage boils off the remaining N-methyl pyrrolidone mixture and discharges the polymeric residue, which is free of solvents, at a temperature ranging from 95 to 150° C. The residue at this point is of heavy mastic consistency. This material, if of satisfactory quality, may be channelled for use. If the quality is unsatisfactory, it may be directly incinerated or otherwise disposed.

If water is not present, a dehydration step is not needed. Where water in excess of 1% is present, it is best to perform a dehydration of the solvent. A fractionating system consisting of a kettle-type boiler and a fractionating tower will perform the dehydration adequately. Water vapor is discharged directly into the atmosphere at the top of the tower and the dehydrated N-methyl pyrrolidone is discharged continuously from the reboiler and returned to the clean solvent tank for reuse.

In the pretreatment alternate method for regeneration and repurifying the N-methyl pyrrolidone for reuse, the residue is first precipitated by the addition to the discharged N-methyl pyrrolidone residue solution in the tanks of 20-50% by volume of water. The precipitated polymeric residues are separated from the pyrrolidone water mixture by either filtration or via a centrifuge. The pyrrolidone/water mixture may then be fed directly to the multi-stage evaporator and from there to the dehydrator as set forth above.

With polyvinyl chloride residues, the first method of regeneration and purification is preferred. With other polymeric materials and particularly copolymers of vinyl compounds, it is often useful to first precipitate the residues. The residues are precipitated as amorphous solids. A centrifuge and/or a filter press has been found completely adequate for removal of a wide spectrum of such precipitated materials.

With both the direct and pretreatment methods, consistent recovery of at least 98% of the N-methyl pyrrolidone was obtained on an industrial scale. Such high recovery efficiency, together with the high solvating efficiency, time efficiency and safety make the process of this invention particularly attractive and economically useful.

The term polymerization apparatus and/or equipment as used herein refers not only to the specific vessels within which polymerization occurs or is induced but includes such associated equipment upon the surfaces of which residues may accumulate. Such equipment includes fractionating columns, process lines, heat exchangers, pumps and reboilers. In each of these, the sprayed N-methyl pyrrolidone has been found to serve as an effective solvent for removing residues which accumulate therein and on the surfaces thereof.

While the term polymerization equipment and apparatus as used herein and in the examples below and is directed specifically to equipment for commercial production of polymers wherein this invention is most specifically useful, the invention is not limited thereto. The process is also useful for the cleansing of apparatus wherein reactions are carried out or liquids held which include, in addition to the normally desired reaction products, accumulated residues resulting from side reactions and which residues are solvated by the N-methyl pyrrolidone in the process of this invention. The invention thus is useful in reaction vessels wherein N-methyl pyrrolidone-soluble side-reaction products have accumulated in and on the surfaces thereto and in the associated equipment. While such side reaction products are usually polymers, such accumulated residues on the surfaces of the vessels need not be polymers but merely soluble in the solvent for this invention to be specifically applicable thereto.

The instant invention will now be illustrated by the following more detailed examples thereof. It is to be noted, however, that the instant invention is not deemed as being limited thereto.

Example 1

The N-methyl pyrrolidone solvent was pumped into a holding tank prior to use in connection with the instant invention. Subsequent to the preparation of a polyvinylchloride polymer, said N-methyl pyrrolidone was passed through a heat exchanger to elevate the temperature of the solvent to 90° C., pumped to retractable revolving spray heads at the top of the reactor and sprayed at a flow rate of approximately 20 to 30 gallons per minute into the 3,700 gallon, glass-lined reactor and associated process equipment to be cleaned. The reactor was filled to approximately one-quarter full with N-methyl pyrrolidone (900 gallons) and the solvent spray shut off. The solvent in the reactor was then agitated by the reactor impellers for approximately 60 minutes. The reactor temperature was maintained at 90–100° C. during this period; then the solvent-containing polymeric contaminants were pumped via the heat exchanger and spray apparatus into a second (3,700 gallon) reactor to be cleaned and the above procedure repeated. After cleaning this second reactor, the used solvent was passed to a system for the regeneration thereof. (N-methyl pyrrolidone in practice does not need to be regenerated until the polymeric residue load in the solvent reaches 1.5 to 5.0%.) As a result of the foregoing cleaning process, it was found that the N-methyl pyrrolidone dissolved and dislodged all visible polyvinylchloride residues which had accumulated on the vessel walls and further that any polyvinylchloride dislodged by the hot spray was dissolved in the agitated hot N-methyl pyrrolidone so as to effect the complete cleaning of the reactor. After draining, the reactor was spray rinsed with water and returned to polymerization service.

Example 2

The above procedure was repeated in the reactor after it was employed for the preparation of polymers and copolymers comprising vinyl acetate, alkyl acrylate, vinyl acetyl ether, and graft copolymers of polyethylene, copolymers of ethylene, and homopolymers of methacrylate, acrylate, and acrylonitriles. The reactor was found to be cleaned as a result of the action of the N-methyl pyrrolidone sufficiently for use without contamination from previous batches.

Example 3

The N-methyl pyrrolidone after cleaning the reactors as in Example 1 was heated to 90° C. and pumped into a holding tank containing a volume of well-agitated ambient temperature water equal to about 25% of the volume of N-methyl pyrrolidone. The polyvinyl chloride present in the N-methyl pyrrolidone precipitated in a fine amorphous, non-tacky form. The precipitate was then separated from the aqueous N-methyl pyrrolidone by means of a centrifuge and the precipitate was then compressed to remove any residual N-methyl pyrrolidone/water solution present therein. Ninety pounds of polymeric residue were thus removed from two reactors by this solvent (3,700 gallon polymerization unit). The separated N-methyl pyrrolidone/water solution was then pumped into a fractionating column and the water stripped therefrom, so as to regenerate the N-methyl pyrrolidone for further use in cleaning processes. In excess of 98% of the original amount of N-methyl pyrrolidone was recovered. Its purity was of commercial quality.

Example 4

The regenerated N-methyl pyrrolidone of Example 3 was passed into a previously vacuum-purged polyvinylchloride reaction kettle and condenser train (3,700 gallon capacity) reactor unit. The solvent, prior to entry thereto, was passed through a heat exchanger so as to heat same to a temperature of approximately 110° C. The solvent was pumped into the reactor and its associated reflux condenser by a revolving spray nozzle at a rate of approximately 40 gallons per minute. The spray was permitted to drain down the walls of the vessel and condense. After the start of spraying of the solvent into the reactor, while the solvent drained at the bottom of the reactor, it was continuously recycled, pumped and sprayed through the reactor and its reflux condenser for a period of approximately 20 minutes, during which time the accumulated polyvinylchloride residues on the walls were dissolved in said solvent.

Subsequent to the end of the time period, the solvent, containing polyvinylchloride contaminants dissolved therein, was discharged from the reactor and passed to a second reactor unit. After the solvent had been discharged from the first reactor, the surface thereof was sprayed with water so as to wash down any residual solvent, containing dissolved or suspended contaminants, from the reactor walls. Subsequent to a second cleaning operation, which was carried out identically with that described above, the discharged solvent was transported for solvent recovery. As a result of the foregoing procedure, the resulting reactor units were found to be free from residual polyvinylchloride contaminants and the units were returned to plant service for further batch polymerization. The recovery of N-methyl pyrrolidone, by a multistage evaporator using a thin film mechanically-aided stage (Rototherm®), followed by fractionation, yielded 98.4% recovery of the solvent. Ninety-three pounds of polymer residue was obtained at the discharge at the mechanical stage of the Rototherm.

What is claimed is:

1. A process for removing the polymeric residues of vinyl halide homopolymer production from the surfaces of polymerization equipment units upon which such residues have accumulated comprising:
   (a) contacting said vinyl halide polymeric residue bearing surfaces of polymerization equipment having residues consisting essentially of vinyl halide homopolymer polymeric residues with a solvent for said residue consisting essentially of N-methyl pyrrolidone heated to a temperature in the range of from about 75° C. to about 150° C. in an amount equal to at least about 10% by volume of the polymerization equipment being cleaned for a period of time sufficient to assure the removal of the accumulated polymeric residue from the surfaces of said equipment; and
   (b) draining the residue-bearing solvent from said equipment,
whereby substantially all of the homopolymer vinyl halide polymeric residues can be removed from the surfaces of the equipment to be cleaned, said solvent being readily capable of regeneration for subsequent use in such residue removal operations.

2. The process according to claim 1 wherein after discharge the surfaces of the equipment are sprayed with water, and the water is thereafter discharged from the equipment.

3. The process according to claim 1 wherein the vinyl compound is vinyl chloride.

4. The process according to claim 1 wherein the amount of N-methyl pyrrolidone is approximately 25% by volume of the polymerization equipment.

5. The process according to claim 1 wherein the residue-containing solvent is regenerated and purified and the N-methyl pyrrolidone is recovered by evaporation means.

6. The process according to claim 5 wherein prior to recovery by evaporation means the major portion of the dissolved polymerization residue is precipitated from the N-methyl pyrrolidone by the addition to the residue-containing solvent of from 20–50% of its volume of water, removing the precipitated residue from the N-methyl pyrrolidone-water mixture by separation means and then regenerating the solvent by feeding the mixture to the evaporation means.

7. The process according to claim 1 wherein the contacting is by spraying of N-methyl pyrrolidone onto the surfaces.

8. The process according to claim 7 wherein the spraying is achieved by spray means introduced in the upper regions of the polymerization equipment and oriented to spray said solvent onto all residue-bearing surfaces of said equipment.

9. The process according to claim 7 which further includes the steps of spraying the heated residue-containing solvent into further units of polymerization equipment and respraying such residue-containing solvent into such further polymerization equipment units until the concentration of the polymeric residues in the solvent is in the range of 1.5% to saturation.

10. The process according to claim 9 wherein the spraying and respraying is conducted for at least ten minutes in each unit of polymerization equipment.

References Cited

UNITED STATES PATENTS

| | | | |
|---|---|---|---|
| 3,624,009 | 11/1971 | Sussman et al. | 134—38 X |
| 2,886,547 | 5/1959 | Baggett et al. | 260—30.2 |
| 2,899,405 | 8/1959 | Coover | 260—30.2 X |
| 2,918,443 | 12/1959 | Roeser | 260—30.2 |
| 3,393,170 | 7/1968 | Koblitz et al. | 260—30.2 |
| 3,429,844 | 2/1969 | Neros et al. | 260—30.2 X |
| 2,888,313 | 5/1959 | Mautner | 8—85 X |
| 2,956,910 | 10/1960 | Giammaria | 134—22 R |
| 3,475,218 | 10/1969 | Torrenzano et al. | 134—10 |
| 3,503,929 | 3/1970 | Loudas | 260—32.4 X |
| 3,503,931 | 3/1970 | Radlmann et al. | 260—49 |
| 3,516,967 | 6/1970 | Funer | 260—32.4 X |
| 3,518,230 | 6/1970 | Sheffer et al. | 260—32.4 X |
| 3,526,610 | 9/1970 | Bower | 260—32.4 X |
| 3,619,295 | 11/1971 | Nishizaki et al. | 134—22 R |

OTHER REFERENCES

Rose, A. and E.: The Condensed Chemical Dictionary, Reinhold, N.Y., 1966, page 626.

BARRY S. RICHMAN, Primary Examiner

U.S. Cl. X.R.

134—10, 13, 22 R, 38; 252—364; 260—30.2